United States Patent
Dey et al.

(10) Patent No.: US 10,271,099 B2
(45) Date of Patent: Apr. 23, 2019

(54) DEEP MOVIE ANALYSIS BASED ON COGNITIVE CONTROLS IN CINEMATOGRAPHY

(71) Applicant: International Business Machines Corporation, Armonk, NY (US)

(72) Inventors: Kuntal Dey, New Delhi (IN); Seema Nagar, Bangalore (IN); Srikanth Govindaraj Tamilselvam, Bangalore (IN); Enara C. Vijil, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/442,842

(22) Filed: Feb. 27, 2017

(65) Prior Publication Data

US 2018/0249209 A1    Aug. 30, 2018

(51) Int. Cl.
*G06F 17/27* (2006.01)
*H04N 21/442* (2011.01)

(52) U.S. Cl.
CPC ... *H04N 21/44218* (2013.01); *G06F 17/2785* (2013.01)

(58) Field of Classification Search
USPC ...................................................... 704/7–10
See application file for complete search history.

(56) References Cited

U.S. PATENT DOCUMENTS

| | | | |
|---|---|---|---|
| 4,996,642 A | 2/1991 | Hey | |
| 8,120,637 B2 | 2/2012 | Baird | |
| 8,914,820 B2 | 12/2014 | Newell | |
| 2013/0204664 A1* | 8/2013 | Romagnolo | G06Q 30/0203 705/7.32 |
| 2015/0350730 A1* | 12/2015 | el Kaliouby | A61B 5/165 725/12 |
| 2017/0046601 A1* | 2/2017 | Chang | G06Q 30/0269 |
| 2017/0052964 A1* | 2/2017 | Hu | G06F 17/3082 |
| 2017/0161796 A1* | 6/2017 | Clark | G06Q 30/0282 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Leonard Saint Cyr
(74) *Attorney, Agent, or Firm* — Rahan Uddin, Esq.; McGinn IP Law Group, PLLC

(57) ABSTRACT

A movie review generating method, system, and computer program product for dynamically generating movie reviews by capturing and aggregating the experience observed by an external observation system, and correlating the observation with the elements of the movie by creating soft-faceted boundaries around the elements.

17 Claims, 5 Drawing Sheets

DEEP MOVIE ANALYSIS BASED ON COGNITIVE CONTROLS IN CINEMATOGRAPHY

BACKGROUND

The present invention relates generally to a movie review generating method, and more particularly, but not by way of limitation, to a system, method, and computer program product for dynamically generating movie reviews by capturing and aggregating the experience observed by an external observation system, and correlating the observation with the elements of the movie by creating soft-faceted boundaries around the elements.

Conventionally, text reviews for movies are provided and the reviews include a score that represents a reception of the movie. Some sources specialize in narrow aspects of film like judging a film's suitability for children or recommending, "rent it" or "matinee" to tell the viewer in what setting to watch. These scores are widely used to sway a possible moviegoer to watch the movie or to skip seeing the movie.

However, the conventional techniques have drawbacks such as a bias in that the moviegoer might not realize the actual experience because of biased opinions afterwards from outsiders, issues in recall in that it may be difficult to recall all review-worthy segments/experiences/aspects, the review itself might be labor-intensive to write an accurate review, there is data loss in that not all moviegoers will review the movies, and the score does not accurately reflect a cohort of viewers most similar to the potential movie moviegoer (i.e., the potential moviegoer is a teenager and the reviews are all written by persons in the age bracket of 45-65).

SUMMARY

In an exemplary embodiment, the present invention can provide a computer-implemented movie review generating method, the method including compiling responses of moviegoers during a movie, detecting elements of the movie including an emotional response by a moviegoer, creating soft segments for the movie including an elements of the elements having the emotional response, and analyzing the responses paired with each soft segment and element to produce a review of each of the soft segments and elements. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
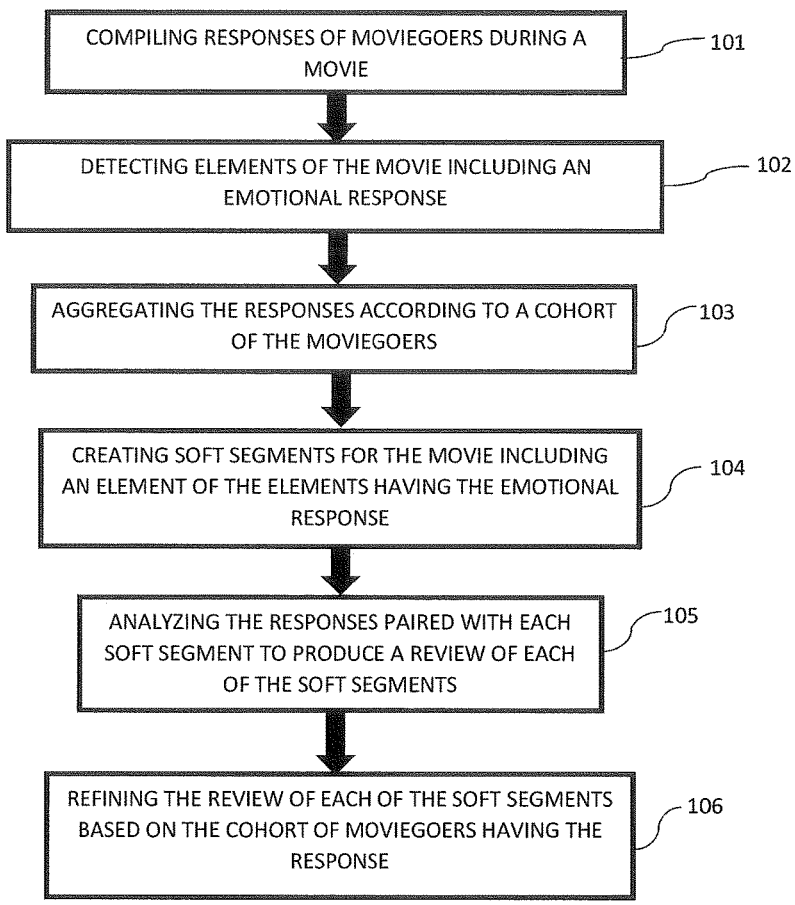
FIG. 1 exemplarily shows a high-level flow chart for a movie review generating method 100 according to an embodiment of the present invention.

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a movie review generating method 100 according to the present invention can include various steps for dynamically generating movie reviews by capturing and aggregating the experience observed by an external observation system, and correlating the observation with the elements of the movie by creating soft-faceted boundaries around the elements. The method 100 can also provide various steps for comparing an automated review with a digital review provided by individuals (e.g., such as online reviews), and thereby (a) automatically tag the manually provided reviews with observed biases towards movie elements and (b) automatically indicate elements missing from each of the manual reviews of the movie, optionally with respect to certain demographics.

Figure 3:
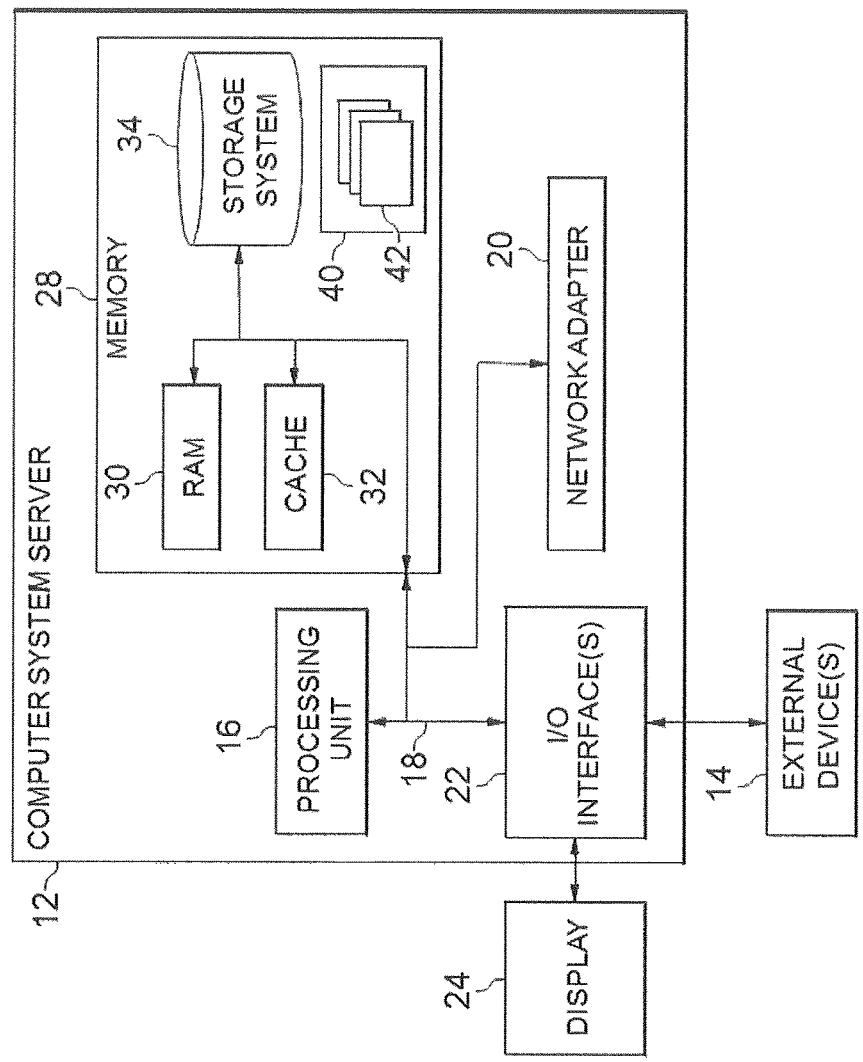
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Thus, a movie review generating method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 4), it is nonetheless understood that the present invention can be implemented outside of the cloud environment.

Figure 2:
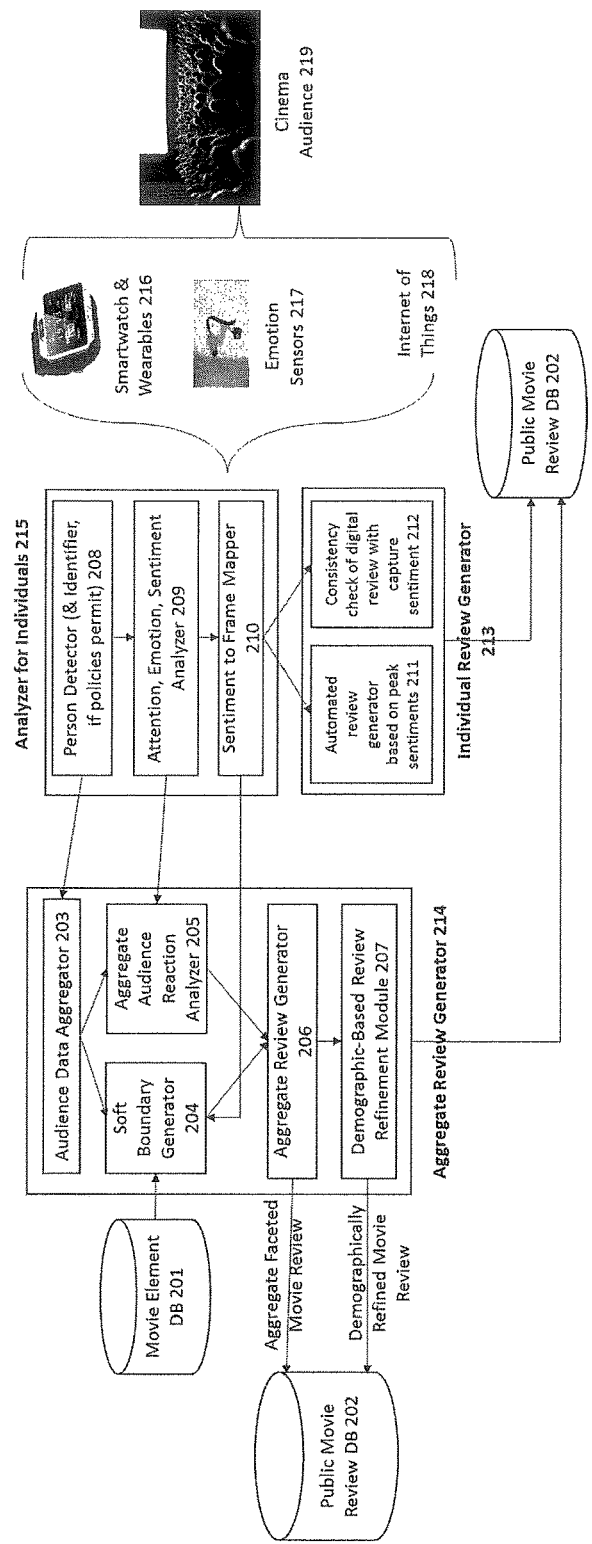
FIG. 2 exemplarily depicts an exemplary system 200 diagram according to an embodiment of the present invention.

Referring now to FIGS. 1 and 2, in step 101, responses of moviegoers (i.e., cinema audience 219) are compiled during a movie. The attention and emotions (i.e., responses) that are expressed during a movie by moviegoers are tracked and compiled. The responses can be tracked by smartwatches and wearables 216 worn by the moviegoer, emotion sensors 217 around the cinema room, and Internet of Things (IoT) 218 devices in the movie theater. Such devices could be provided by the cinema or by the moviegoer (and preferably having the device registered to the moviegoer). Each individual moviegoer is identified such as by a person detector 208 in the movie theater. It is noted that the identity of each individual can be identified if policy allows for it (i.e., privacy concerns are waived). The attention, emotion, sentiment analyzer 209 compiles each emotional response of each moviegoer towards the movie. For example, a moviegoer can laugh, cry, fall asleep, look unenthused, etc.

In step 102, elements of the movie including an emotional response are detected or uploaded from a movie element database 201. That is, elements of the movie such as actors, scenes, sequences, etc. that include an emotional response are detected and stored as an element for review. The emotional responses can be filtered according to a "high" emotional response. It is noted that "high" emotional response is objective and can be set by a system administrator. For example, "high" can be a fixed predetermined threshold or can be determined by a number of moviegoers out of the entire audience responding to a scene or that the emotional response is above a threshold level (i.e., a certain amount of laughter above a threshold) based on the number of moviegoers. Alternatively, a system administrator can predetermine each of the elements of the movie for review such as filtering the elements for only each credited actor/actress but not extras.

In step 103, the responses are aggregated according to a cohort of the moviegoers. That is, the moviegoers are classified according to a cohort (i.e., age, gender, ethnicity, etc.) and the responses for each cohort are separated out such that reviews can be generated based on only a cohort's responses (i.e., a review based on reactions of only teenagers). The audience data aggregator 203 can interface with the person detector 208 to aggregate out the responses of each individual according to a cohort to which they belong and the aggregate audience reaction analyzer 205 can perform the analysis of the cohorts.

In step 104, soft segments for the movie are created including an element of the elements having the emotional response. That is, the soft boundary generator 204 can create soft segment boundaries (i.e., a first time (t1) to a second time (t2)) for the movie and treat each such boundary as a facet, pivoting around an element or a combination of the elements (such as, a given actor shown on a hill, a given actor shown in a certain room of a house etc.). It is noted that these facets are not necessarily temporally continuous (for example, a soft boundary could include actor A in room R from time t1 to t2, and then from time t3 to t4—and this together could be treated as just one facet contained within one soft boundary). Thus, the elements are associated with segments in the movie such that the responses can be categorized according to the segments (i.e., laughing at some scenes of actor A but not at others). Also, soft boundaries can be added (created) for continuous time segments where a start reaction was observed to be made by a significant fraction of the audience.

That is, each soft boundary includes at least one element that the responses to the element can be tracked.

In step 105, the responses paired with each soft segment are analyzed to produce a review of each of the soft segments, which can be combined to produce a review of the entire movie. In other words, the emotional responses of the moviegoers towards an element in a soft segment are analyzed and compiled together to provide a review the entire movie. For example, the automated review generator based on peak sentiments 211, the attention, emotion, sentiment analyzer 209, the sentiment-to-frame mapper 210, and the aggregate review generator 206 can analyze the aggregate reaction (attention, emotions etc.) with respect to each of the soft segment boundaries, and produce a text description of the segment highlighting the primary aspects such as the actor name and scene type (i.e., "actor A in a room"), the set of prominent reactions observed among the audience (i.e., "the audience was in general happy, and many of them were seen smiling), and the time spans of the soft boundary (i.e., "this happened for 10 minutes around the 1-hour time, and once more from around the 85th minute of the movie for about 8 minutes"). Thresholds can be defined, and statistical measures can be used ("more than threshold percentage" to embody terms such as "in general", "not many" etc.)

Thus, the compiled responses to the soft segments are used to output a movie review to the public movie review DB 202.

In other words, each element (i.e., actor, scene, etc.) of the soft segments is paired with the responses to the element in the soft segment (i.e., how the moviegoer responds to an actor in the segment), etc. Then, the responses paired with each soft segment and each element of the soft segment are analyzed. A review is produced by compiling all of the analysis of the responses paired with the soft segments and each element (i.e., response to element one of soft segment one, response to element two of soft segment two, . . . response to element "n" of soft segment "n").

Also, since the elements can be individualized for scenes and actors, an assessment of how well an actor acted throughout the entire movie can be analyzed more accurately than the conventional "award show voting" techniques. For example, the best actor award at an award show can be objectively determined based on genuine audience reaction and reception of the performance rather than bias or swayed voting result in the award show voting system.

In step 106, the review of each of the soft segments (or the movie review in general) can be refined based on the cohort of moviegoers having the response. In other words, a movie review specifically refined to one or more cohort can be created by the demographic-based review refinement module 207. In this manner, a teenager, for example, can read movie reviews that are only based on how other teenagers viewed the movie.

Therefore, in steps 101-106 and the components of the system 200 in FIG. 2, soft faceted boundaries can be created by combining a subset of elements and scenes, and overlaying the intensity of user reactions to such elements and scenes of which the correlation can be carried out by analyzing the elements (such as actors, scenes etc.) and the corresponding audience reaction to create a movie review. Thus, the dynamically generated reviews are post-facto used to "normalize" (tag) with individual user level review bias elements (which segment of the movie had generated significant attention or evoked different emotions) and provide recall (some aspects of the movie that is absent from an individual's review although it had evoked mass reactions). The users can be incentivized to opt-in for these schemes through promotional offers, discounts, gifts, opportunities to win a grand prize, etc.

The review is more objective and temporally related to the moviegoers actual movie experience, sentiment, and emotional response to each segment.

Further, the moviegoers movie reviews can be analyzed and aggregated to determine the typical scores, specific moviegoers likes and dislikes, etc.

In some embodiments, when the individual is permitted to be identified, the review can be compared automatically with digital reviews provided by individuals (such as online reviews) by the consistency check of digital review with capture sentiment 212, and be used to tag the manually provided reviews with observed biases towards movie elements and indicate elements missing from each of the manual reviews of the movie. For example, a manual review (i.e., a review completed by the conventional techniques) can be corrected for missing pieces such as missing a review of one of the actors in the movie. Also, reviews can be flagged that are inconsistent with any captured response by moviegoers (i.e., a review states "the movie was funny" but the movie is a horror film and not one moviegoer has a "funny" response while watching).

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
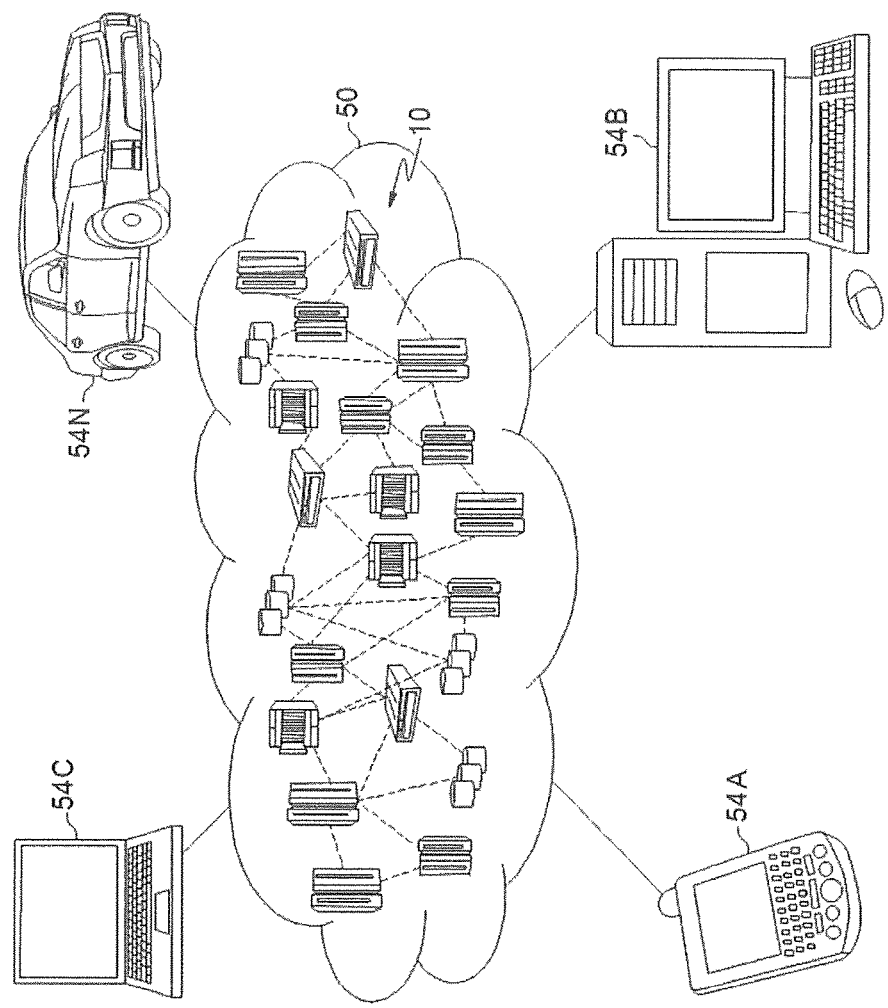
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
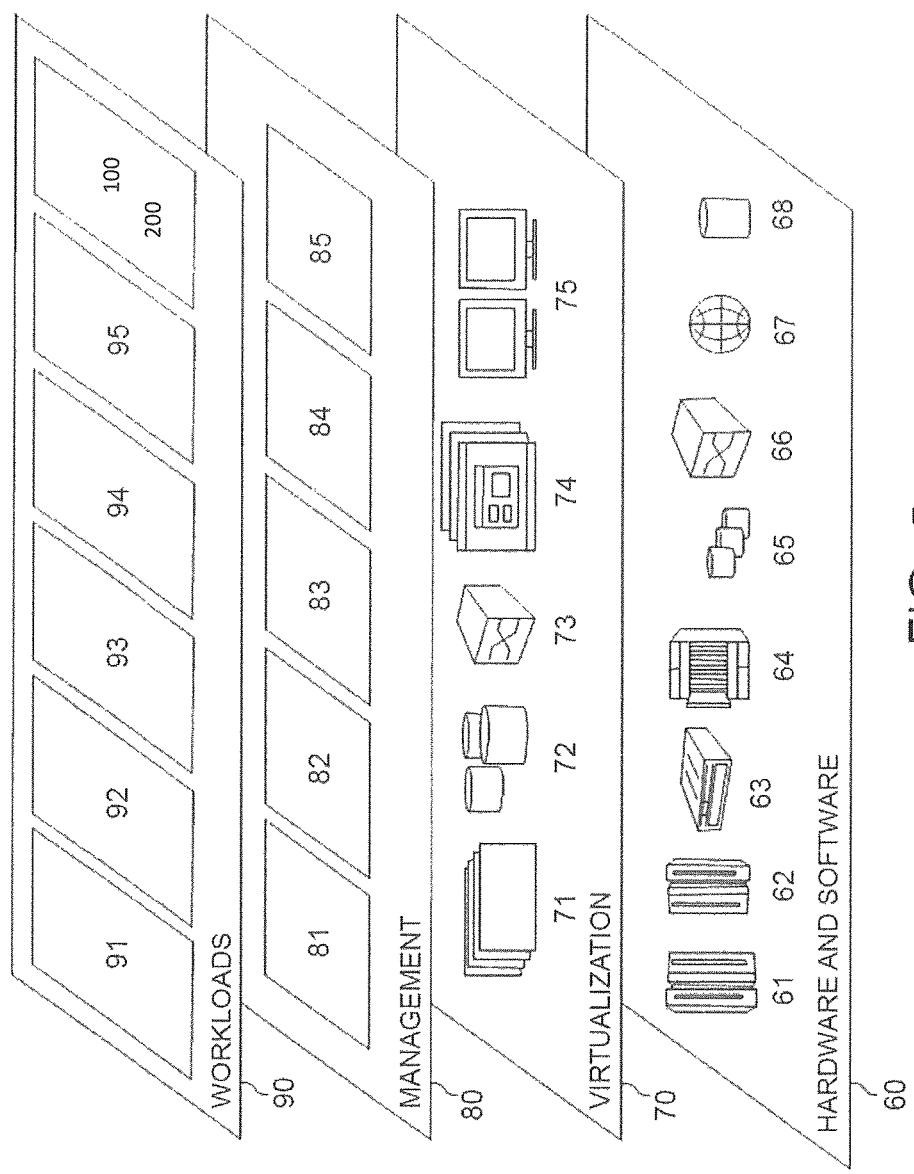
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and movie review generating method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented cinematography review generating method, the method comprising:
    compiling responses of viewers during a motion picture;
    detecting elements of the motion picture including an emotional response by a viewer;
    creating soft segments for the motion picture including an element of the elements having the emotional response;
    analyzing the responses paired with each soft segment and element to produce an automated review of each of the soft segments and the elements, the automated review being produced by compiling all of the analyzed responses aggregated across all viewers;
    providing the viewers with assistance in writing a viewer generated review of the motion picture by reminding the viewers of points during the soft segments that the viewers had the emotional response towards the motion picture and combining the viewer generated review with the automated review to create a compiled review;
    aggregating the responses of the viewers according to a cohort to which the viewers belong; and
    refining the review of each of the soft segments to include only the viewers of the cohort,
    wherein the review is compared with a prior existing review stored in a database to identify differences between the prior existing review and the review, and to identify bias in the prior existing review based on an identity of the viewer and the cohort of the viewer,
    wherein the automated review is created by combining a subset of the elements, and overlaying an intensity of viewer reactions to the elements of which a correlation is carried out by analyzing the elements and the corresponding audience reaction, and
    wherein the review is post-facto used to normalize with an individual viewer level review bias element, based on the identified bias, which segment of the motion picture had generated an attention of the viewer, provide a recall of a specific emotional response by the viewer to the segment, and request that the viewer update the review after the recall is provided.

2. The computer-implemented method of claim 1, wherein the elements comprise at least one of:
    an actor; and
    a scene of the motion picture.

3. The computer-implemented method of claim 1, wherein the responses comprise at least one of:
    an emotional reaction to the element of the soft segment;
    a sentiment towards the element of the soft segment; and
    an attention span of the viewer during the soft segment including the element.

4. The computer-implemented method of claim 1, wherein the soft segments include segments of the motion picture at different times of the motion picture including the element.

5. The computer-implemented method of claim 1, embodied in a cloud-computing environment.

6. The computer-implemented method of claim 1, wherein the review is corrected for a missing piece of information from the review based on the detected elements of the motion picture.

7. The computer-implemented method of claim 1, wherein the review is flagged when the review conflicts with the detected elements of the motion picture.

8. The computer-implemented method of claim 1, wherein the review is flagged when the review conflicts with the responses of the viewers.

9. A non-transitory computer program product for cinematography review generation, the computer program product comprising a computer readable storage medium having program instructions embodied therewith, the program instructions executable by a computer to cause the computer to perform:
    compiling responses of viewers during a motion picture;
    detecting elements of the motion picture including an emotional response by a viewer;
    creating soft segments for the motion picture including an element of the elements having the emotional response;
    analyzing the responses paired with each soft segment and element to produce an automated review of each of the soft segments and the elements, the automated review being produced by compiling all of the analyzed responses aggregated across all viewers;
    providing the viewers with assistance in writing a viewer generated review of the motion picture by reminding the viewers of points during the soft segments that the viewers had the emotional response towards the motion picture and combining the viewer generated review with the automated review to create a compiled review;
    aggregating the responses of the viewers according to a cohort to which the viewers belong; and
    refining the review of each of the soft segments to include only the viewers of the cohort, wherein the review is compared with a prior existing review stored in a database to identify differences between the prior existing review and the review, and to identify bias in the prior existing review based on an identity of the viewers and the cohort of the viewer, wherein the automated review is created by combining a subset of the elements, and overlaying an intensity of viewer reactions to the elements of which a correlation is carried out by analyzing the elements and the corresponding audience reaction, and wherein the review is post-facto used to normalize with an individual viewer level review bias element, based on the identified bias, which segment of the motion picture had generated an attention of the viewer, provide a recall of a specific emotional response by the viewer to the segment, and request that the viewer update the review after the recall is provided.

10. The non-transitory computer program product of claim 9, wherein the elements comprise at least one of:
   an actor; and
   a scene of the motion picture.

11. The non-transitory computer program product of claim 9, wherein the responses comprise at least one of:
   an emotional reaction to the element of the soft segment;
   a sentiment towards the element of the soft segment; and
   an attention span of the viewer during the soft segment including the element.

12. The non-transitory computer program product of claim 9, wherein the soft segments include segments of the motion picture at different times of the motion picture including the element.

13. A cinematophraphy review generating system, said system comprising:
   a processor, and
   a memory, the memory storing instructions to cause the processor to perform:
      compiling responses of viewers during a motion picture;
      detecting elements of the motion picture including an emotional response by a viewer;
      creating soft segments for the motion picture including an element of the elements having the emotional response;
      analyzing the responses paired with each soft segment and element to produce an automated review of each of the soft segments and the elements, the automated review being produced by compiling all of the analyzed responses aggregated across all viewers;
      providing the viewers with assistance in writing a viewer generated review of the motion picture by reminding the viewers of points during the soft segments that the viewers had the emotional response towards the motion picture and combining the viewer generated review with the automated review to create a compiled review;
      aggregating the responses of the viewers according to a cohort to which the viewers belong; and
      refining the review of each of the soft segments to include only the viewers of the cohort,
   wherein the review is compared with a prior existing review stored in a database to identify differences between the prior existing review and the review, and to identify bias in the prior existing review based on an identity of the viewer and the cohort of the viewer,
   wherein the automated review is created by combining a subset of the elements, and overlaying an intensity of viewer reactions to the elements of which a correlation is carried out by analyzing the elements and the corresponding audience reaction, and
   wherein the review is post-facto used to normalize with an individual viewer level review bias element, based on the identified bias, which segment of the motion picture had generated an attention of the viewer, provide a recall of a specific emotional response by the viewer to the segment, and request that the viewer update the review after the recall is provided.

14. The system of claim 13, wherein the elements comprise at least one of:
   an actor; and
   a scene of the motion picture.

15. The system of claim 13, wherein the responses comprise at least one of:
   an emotional reaction to the element of the soft segment;
   a sentiment towards the element of the soft segment; and
   an attention span of the viewer during the soft segment including the element.

16. The system of claim 13, wherein the soft segments include segments of the motion picture at different times of the motion picture including the element.

17. The system of claim 13, embodied in a cloud-computing environment.

* * * * *